(12) United States Patent
Schibilla et al.

(10) Patent No.: US 8,166,233 B2
(45) Date of Patent: Apr. 24, 2012

(54) GARBAGE COLLECTION FOR SOLID STATE DISKS

(75) Inventors: Mark R. Schibilla, Rochester, MN (US); Randy J. Reiter, Rochester, MN (US)

(73) Assignee: LSI Corporation, Milpitas, CA (US)

( * ) Notice: Subject to any disclaimer, the term of this patent is extended or adjusted under 35 U.S.C. 154(b) by 452 days.

(21) Appl. No.: 12/508,879

(22) Filed: Jul. 24, 2009

(65) Prior Publication Data
US 2011/0022778 A1    Jan. 27, 2011

(51) Int. Cl.
*G06F 13/00* (2006.01)
(52) U.S. Cl. .......................... 711/103; 711/154; 711/166
(58) Field of Classification Search .................. 711/103, 711/154, 166
See application file for complete search history.

(56) References Cited

U.S. PATENT DOCUMENTS

| | | | |
|---|---|---|---|
| 2008/0034153 A1* | 2/2008 | Lee et al. | 711/103 |
| 2009/0271562 A1* | 10/2009 | Sinclair | 711/103 |

OTHER PUBLICATIONS

Sun et al.; On the Use of Strong BCH Codes for Improving Multilevel NAND Flash Memory Storage Capacity; ECSE Department, Rensselaer Polytechnic Institute, Aug. 2006; USA.

Micro Technology, Inc.; NAND Flash 101: An Introduction to NAND Flash and How to Design it into your next Product; TN-29-19; 2006; pp. 1-28; Micron Technology, Inc. Boise, Idaho, USA.

Andrew Birrell & Michael Isard, et al., A Design for High-Performance Flash Disks, ACM SIGOPS Operating Systems Review, vol. 41, Issue 2, pp. 88-93, (Apr. 2007).

Jeong-Uk Kang & Heeseung Jo, et al., A Superblock-Based Flash Translation Layer for NAND Flash Memory, Proceedings of the 6th ACM & IEEE International Conference On Embedded Software, pp. 161-170, (Oct. 22-25, 2006).

* cited by examiner

*Primary Examiner* — Reba I Elmore

(57) ABSTRACT

Described embodiments provide a method of recovering storage space on a solid state disk (SSD). An index and valid page count are determined for each block of a segment of an SSD. If the valid page count of at least one block in the segment is zero, a quick clean is performed. A quick clean deallocates blocks having zero valid pages and places them in a queue for erasure. Otherwise, a deep clean is performed. A deep clean determines a compaction ratio, N-M, wherein N is a number of partially valid blocks and M is a number of free blocks required to compact the valid data from the N partially valid blocks into M entirely valid blocks. At least one data structure of the SSD is modified to refer to the M entirely valid blocks, and the N partially valid blocks are placed in the queue for erasure.

20 Claims, 5 Drawing Sheets

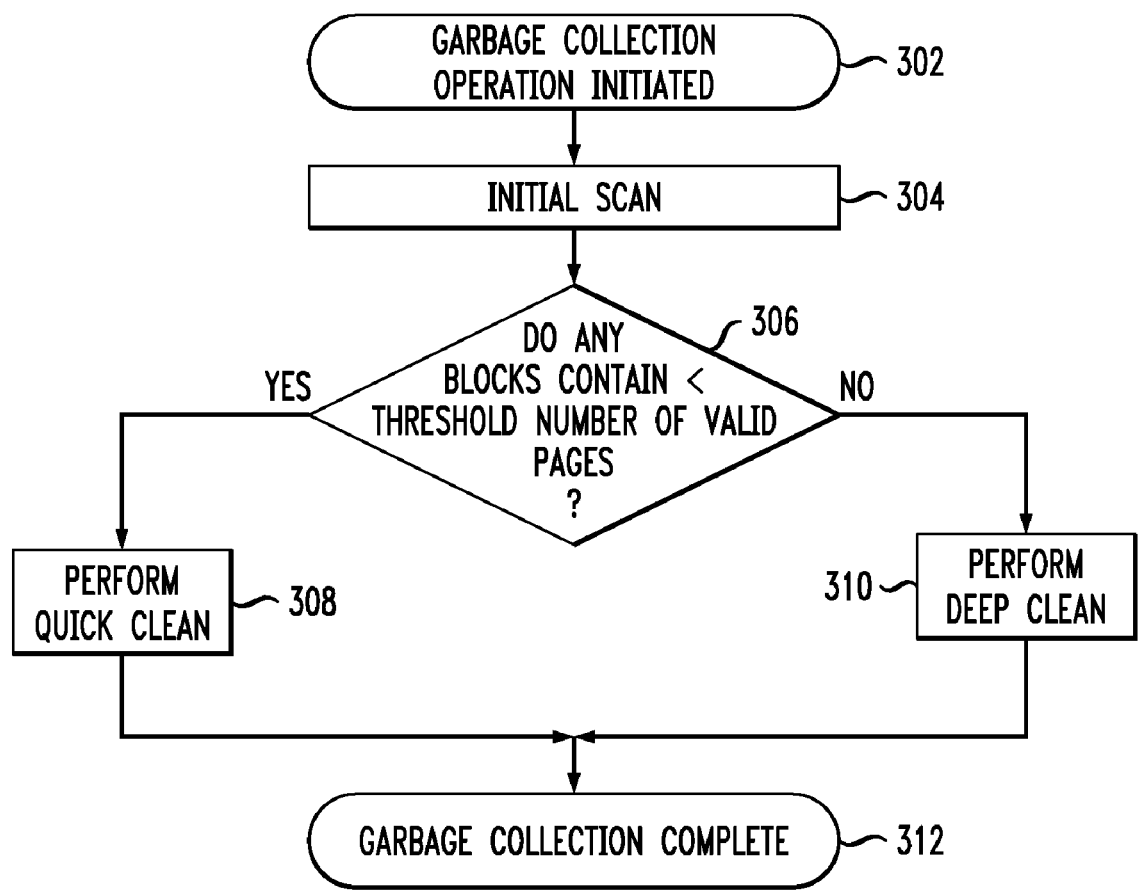

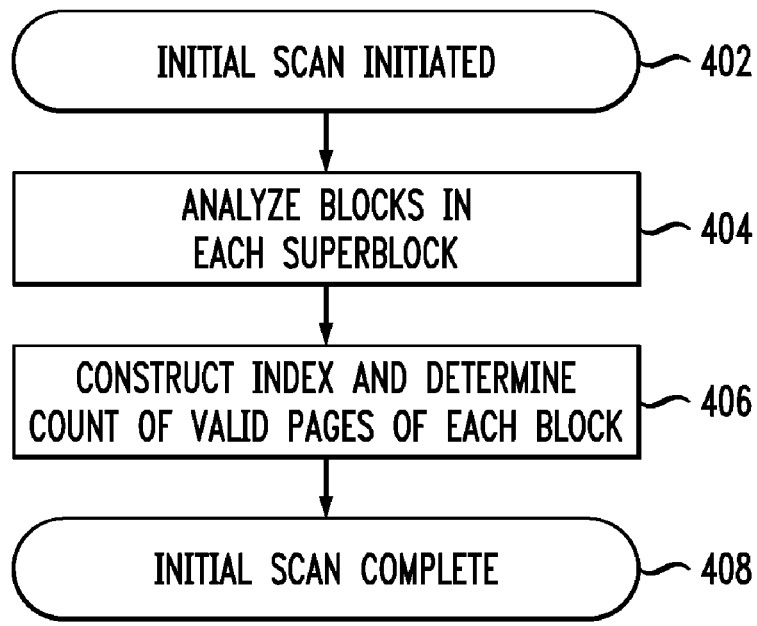
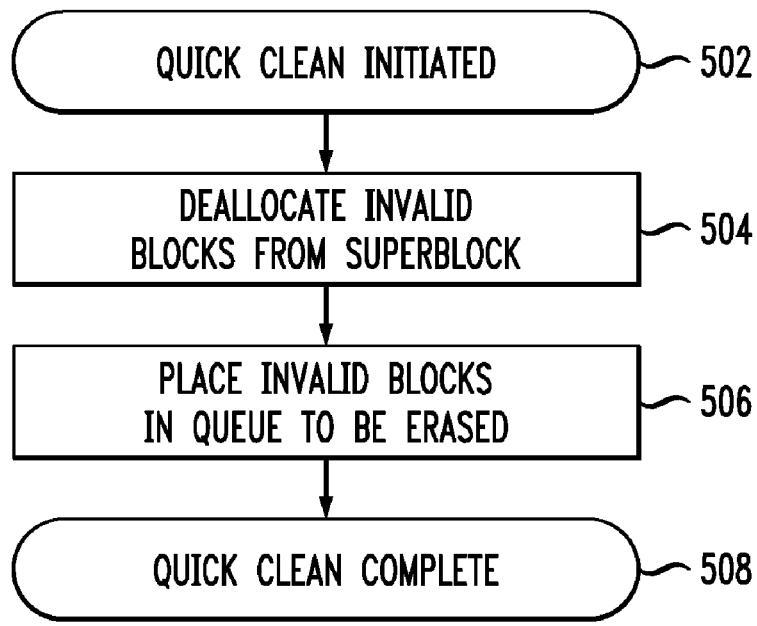

GARBAGE COLLECTION FOR SOLID STATE DISKS

CROSS-REFERENCE TO RELATED APPLICATIONS

The subject matter of this application is related to U.S. patent application Ser. No. 12/436,227filed May 6, 2009, Ser. No. 12/477,996 filed Jun. 4, 2009, and Ser. No. 12/478,013 filed Jun. 4, 2009, the teachings of all of which are incorporated herein in their entireties by reference. The subject matter of this application is also related to U.S. patent application Ser. No. 12/475,710 filed Jun. 1, 2009, Ser. No. 12/475,716 filed Jun. 1, 2009, Ser. No. 12/508,915 filed Jul. 24, 2009, Ser. No. 12/643,471 filed Dec. 21, 2009, Ser. No. 12/649,490 filed Dec. 30, 2009, Ser. No. 12/722,828 filed Mar. 12, 2010, Ser. No. 12/730,627filed Mar. 24, 2010, Ser. No. 12/731,631 filed Mar. 25, 2010, Ser. No. 12/767,985 filed Apr. 27, 2010, Ser. No. 12/768,058 filed Apr. 27, 2010, Ser. No. 12/769,882 filed Apr. 29, 2010 and Ser. No. 12/769,910 filed Apr. 29, 2010.

BACKGROUND OF THE INVENTION

1. Field of the Invention

The present invention relates to flash memory storage devices, and, in particular, to garbage collection routines for solid state disks (SSDs).

2. Description of the Related Art

Flash memory is a type of non-volatile memory that is electrically erasable and re-programmable. Flash memory is primarily used in memory cards and USB flash drives for general storage and transfer of data between computers and other digital products. Flash memory is a specific type of electrically erasable programmable read-only memory (EEPROM) that is programmed and erased in large blocks. One commonly employed type of flash memory technology is NAND flash memory. NAND flash memory forms the core of the flash memory available today, especially for removable universal serial bus (USB) storage devices known as USB flash drives, as well as most memory cards. NAND flash memory exhibits fast erase and write times, requires small chip area per cell, and has high endurance. However, the I/O interface of NAND flash memory does not provide full address and data bus capability and, thus, generally does not allow random access to memory locations.

There are three basic operations for NAND devices: read, write and erase. The read and write operations are performed on a page by page basis. Page sizes are generally $2^N$ bytes, where N is an integer, with typical page sizes of, for example, 2,048 bytes (2 kb), 4,096 bytes (4 kb), 8,192 bytes (8 kb) or more per page. Pages are typically arranged in blocks, and an erase operation is performed on a block by block basis. Typical block sizes are, for example, 64 or 128 pages per block. Pages must be written sequentially, usually from a low address to a high address. Lower addresses cannot be rewritten until the block is erased.

A hard disk is addressed linearly by logical block address (LBA). A hard disk write operation provides new data to be written to a given LBA. Old data is over-written by new data at the same physical LBA. NAND flash memories are accessed analogously to block devices, such as hard disks. NAND devices address memory linearly by page number. However, each page might generally be written only once since a NAND device requires that a block of data be erased before new data is written to the block. Thus, for a NAND device to write new data to a given LBA, the new data is written to an erased page that is a different physical page from the page previously used for that LBA. Therefore, NAND devices require device driver software, or a separate controller chip with firmware, to maintain a record of mappings of each LBA to the current page number where its data is stored. This record mapping is typically managed by a flash translation layer (FTL) in software that might generate a logical to physical translation table. The flash translation layer corresponds to the media layer of software and/or firmware controlling an HDD.

Associated with each page is a spare area (typically 100-500 bytes) generally used for storage of error correction code (ECC) information and for storage of metadata used for memory management. The ECC is generally needed for detecting and correcting errors in the user data stored in the page, and the metadata is used for mapping logical to and from physical addresses. As such, the additional bytes of memory are "hidden" from the user and are not available for storing data. The first block (block 0) of a flash die is generally provided from the manufacturer error-free, and is commonly used by designers to include program code and associated metadata for block management.

Typically, for high capacity solid state disks (SSDs), several design tradeoffs might be considered when implementing a method to maintain a logical to physical translation table. These tradeoffs typically include: efficient random access memory (RAM) usage; efficient flash usage; fast address lookup for both read operations and write operations; and fast reconstruction of the translation table on device startup.

Several techniques are known in the art for maintaining the logical to physical translation table. One such approach is known as direct page mapping, an example of which is described in the paper by Andrew Birrell & Michael Isard, et al., A DESIGN FOR HIGH-PERFORMANCE FLASH DISKS, *ACM SIGOPS Operating Systems Review*, Vol. 41, Issue 2, pp. 88-93, (April 2007), which is incorporated herein by reference in its entirety (hereinafter "Birrell"). Direct page mapping maintains a lookup table in RAM having an entry for each flash page, and a summary page for metadata at the end of each block, from which the logical to physical translation table may be reconstructed at startup. For example, a direct page mapped translation table might contain, for every LBA, a logical sector number corresponding to a physical block number and a physical page number. Thus, direct page mapping comprises a single-level logical-to-physical translation. The summary page for each block might contain the LBA and valid bits for each page in the block so that the translation table can be reconstructed at startup. Thus, the direct page mapping scheme requires a large amount of RAM (on the order of 1-2 MB per GB of user storage) to store the translation table, which can become burdensome for higher capacity SSDs.

Another approach is known as block mapping. Block mapping generally classifies blocks as either data blocks (D-blocks) or update blocks (U-blocks). The total size of the D-blocks is the effective storage space for user data. U-blocks are invisible to users. Generally, when a write command cannot be accommodated in the D-block corresponding to the LBA, a U-block is allocated to receive the new data and the old data in the D-block is invalidated. Subsequent writes to that D-block will be received by the allocated U-block. When the U-block becomes full, another U-block might be allocated, or the U-block might be merged with the original D-block. Thus, block mapping maintains a lookup table in RAM that maps a logical block to a physical block. Block mapping lacks a page-level map, relying instead on the typical case that data is stored in sequential order within the block.

For example, a block mapped translation table might contain a logical sector number corresponding to a logical block number and a logical page number. The logical block number can be translated into a physical block number and the logical page number might correspond to a physical offset within the physical block. Thus, block mapping comprises a two-level logical-to-physical translation. The size of the translation table is proportional to the number of blocks in the flash memory, thus requiring less RAM than a page mapped translation table.

However, because block mapping does not have a page-level map, the flash media may be inefficiently utilized when the data access workload is non-sequential. For non-sequential data access workloads, block mapping might require data to be copied and re-written numerous times to maintain the correct mapping. An example of block mapping is described in the paper by Jeong-Uk Kang & Heeseung Jo, et al., A SUPERBLOCK-BASED FLASH TRANSLATION LAYER FOR NAND FLASH MEMORY, Proceedings of the 6th ACM & IEEE International Conference On Embedded Software, pp. 161-170, (Oct. 22-25, 2006), which is incorporated herein by reference in its entirety (hereinafter "Kang").

A third approach for maintaining the logical-to-physical translation table is known as superblock mapping. Superblock mapping groups together a set number of adjacent logical blocks into a superblock. Superblock mapping maintains a page global directory (PGD) in RAM for each superblock. Page middle directories (PMDs) and page tables (PTs) are maintained in flash. Each LBA can be divided into a logical block number and a logical page number, with the logical block number comprising a superblock number and a PGD index offset. The logical page number comprises a PMD index offset and a PT index offset. Each entry of the PGD points to a corresponding PMD. Each entry of the PMD points to a corresponding PT. The PT contains the physical block number and the physical page number of the data. Super-block mapping, thus, comprises a four-level logical-to-physical translation and provides page-mapping.

The PMD's and PT's are stored in the spare areas of the flash pages to provide page-mapping without using an excessive amount of RAM. However, because the spare area is used to store page-level mapping information, less memory is available for error correction codes (ECC). Further, the limited amount of memory available in the spare area precludes storing complicated mapping information. Finally, reconstruction of the translation table at startup can be time-intensive. An example of a superblock mapping scheme is described in Kang.

As described above, for write operations NAND devices store the new data for the LBA on a new page, unlike hard disk drives (HDDs) that can rewrite individual physical sectors. Thus, a NAND device generally requires that a block be erased before new data can be written to the block. Further, as described above, often a NAND device will write new data for a given LBA to an erased page that is a different physical page from the page previously used for that LBA. Thus, NAND devices also generally require the device driver software or the separate controller chip periodically initiate a process to erase data that is "stale" or out-of-date. As would be apparent to one of skill in the art, without periodically erasing out-of-date data, the flash memory would fill up with data that is mostly out-of-date. This inefficiency would reduce the realized flash memory capacity because less current data could be stored. Therefore, device driver software or controller chips generally periodically run a "garbage collection" routine adapted to provide efficient flash memory utilization by erasing out-of-date blocks. An example of a garbage collection routine is described in Kang. Garbage collection routines impact performance of the flash memory system by utilizing processor resources and potentially delaying write operations to the flash media.

However, NAND device blocks can be erased a limited number of times before device failure (typically on the order of 100,000 erasures). Therefore, over the operational life of an SSD, blocks of flash memory will fail and become unusable. Thus, the device driver software or the separate controller chip should minimize the number of erasures, and must also maintain a record of bad blocks. For example, device driver software or controller chips might implement wear leveling to spread the erasing and writing of blocks over the entire flash memory evenly to avoid repeatedly erasing and writing a given subset of blocks.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a method of recovering storage space on a solid state disk (SSD). An index and valid page count are determined for each block of at least one segment of an SSD. If the valid page count of at least one block in the segment is zero, then a quick clean is performed. For some embodiments, a quick clean deallocates blocks having zero valid pages from the segment of the SSD and places the deallocated blocks in a queue for erasure. Otherwise, a deep clean is performed. For some embodiments, a deep clean determines a compaction ratio, N-M, for the at least one segment of the SSD, wherein N is a number of partially valid blocks and M is a number of free blocks corresponding to compiled valid data from each of the N partially valid blocks. Valid data from each of the N partially valid blocks is compacted into M free blocks, forming M entirely valid blocks. At least one data structure of the SSD is modified to refer to the M entirely valid blocks, and the N partially valid blocks are placed in the queue for erasure.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 3 shows a method of garbage collection, in accordance with an exemplary embodiment of the present invention;

FIG. 4 shows detail of an exemplary initial scan sub-routine of the garbage collection of FIG. 3;

FIG. 5 shows detail of an exemplary quick clean sub-routine of the garbage collection of FIG. 3.

DETAILED DESCRIPTION

In accordance with embodiments of the present invention, garbage collection operations for solid state disks (SSDs) are provided. Garbage collection operations allow a flash memory storage system to update a logical memory location by writing data to a new physical memory location without necessarily updating or erasing the previously used physical memory location simultaneously. Garbage collection operations "clean" physical memory locations containing out-of-date or invalid data at a later time. Embodiments of the present invention might provide garbage collection operations to prioritize which blocks to clean in order to minimize the performance impact of garbage collection operations on a given flash memory storage system.

Figure 1:
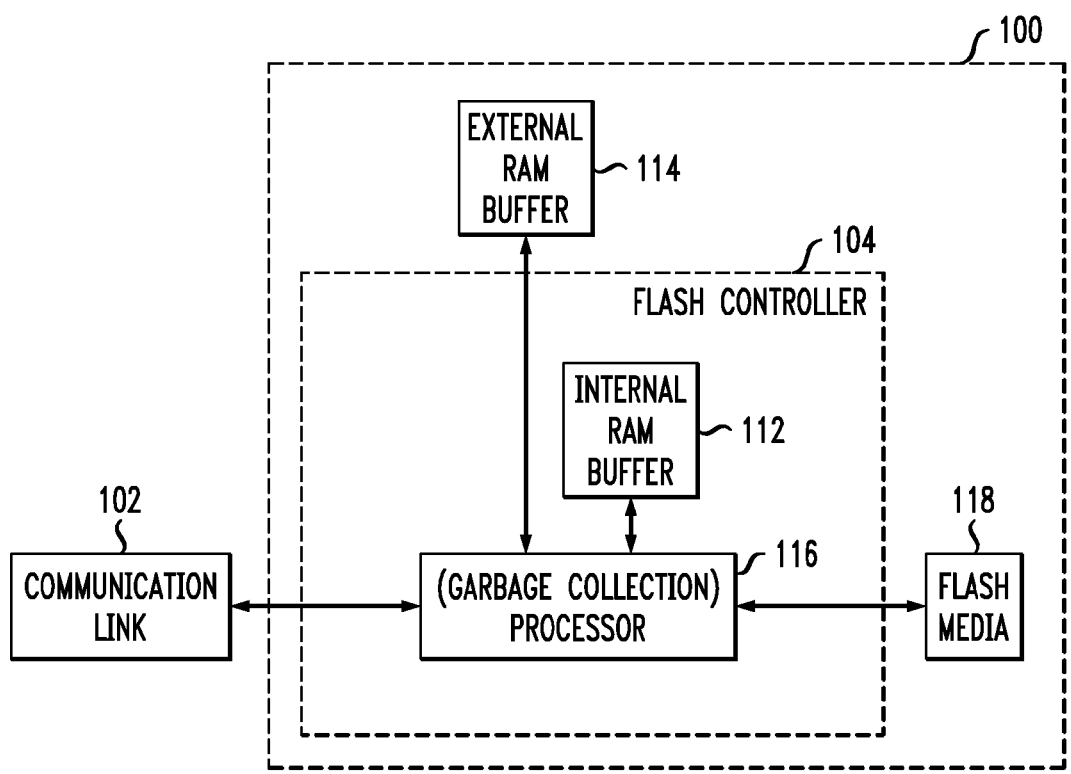
FIG. 1 shows a block diagram of a flash memory storage system implementing a garbage collection routine in accordance with exemplary embodiments of the present invention.

FIG. 1 shows a block diagram of flash memory storage system 100 implementing a garbage collection routine in accordance with exemplary embodiments of the present invention. As shown, flash memory storage system 100 is electrically coupled to communication link 102. Flash memory storage system 100 comprises flash controller 104, optional external RAM buffer 114, and flash media 118. Communication link 102 is employed for communication with one or more external devices, such as a computer system or a networking device, which interface with flash memory storage system 100. Communication link 102 might be a custom-designed communication link, or might be a standard communication protocol link such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, or any other similar interface link for connecting a peripheral device to a computer.

Flash controller 104 controls transfer of data between flash media 118 and an external device coupled to communication link 102. Flash controller 104 might be implemented as a system-on-chip (SoC). Flash controller 104 might include internal RAM buffer 112 and might also be coupled to additional external memory, shown as external RAM buffer 114. In an exemplary embodiment, internal RAM buffer 112 comprises 128 kB of static RAM (SRAM) and external RAM buffer 114 comprises 512 MB of double data rate version 2 dynamic RAM (DDR2 DRAM). RAM buffer 112 might act as a cache for processor 116, while RAM buffer 114 might act as a read/write buffer between flash media 118 and communication link 102. Although shown in FIG. 1 as a single processor, processor 116 might be implemented with multiple processors (not shown). Processor 116 includes software and/or firmware as needed for operation, including those for garbage collection in accordance with exemplary embodiments of the present invention, as described subsequently, with respect to FIG. 2.

Figure 2:
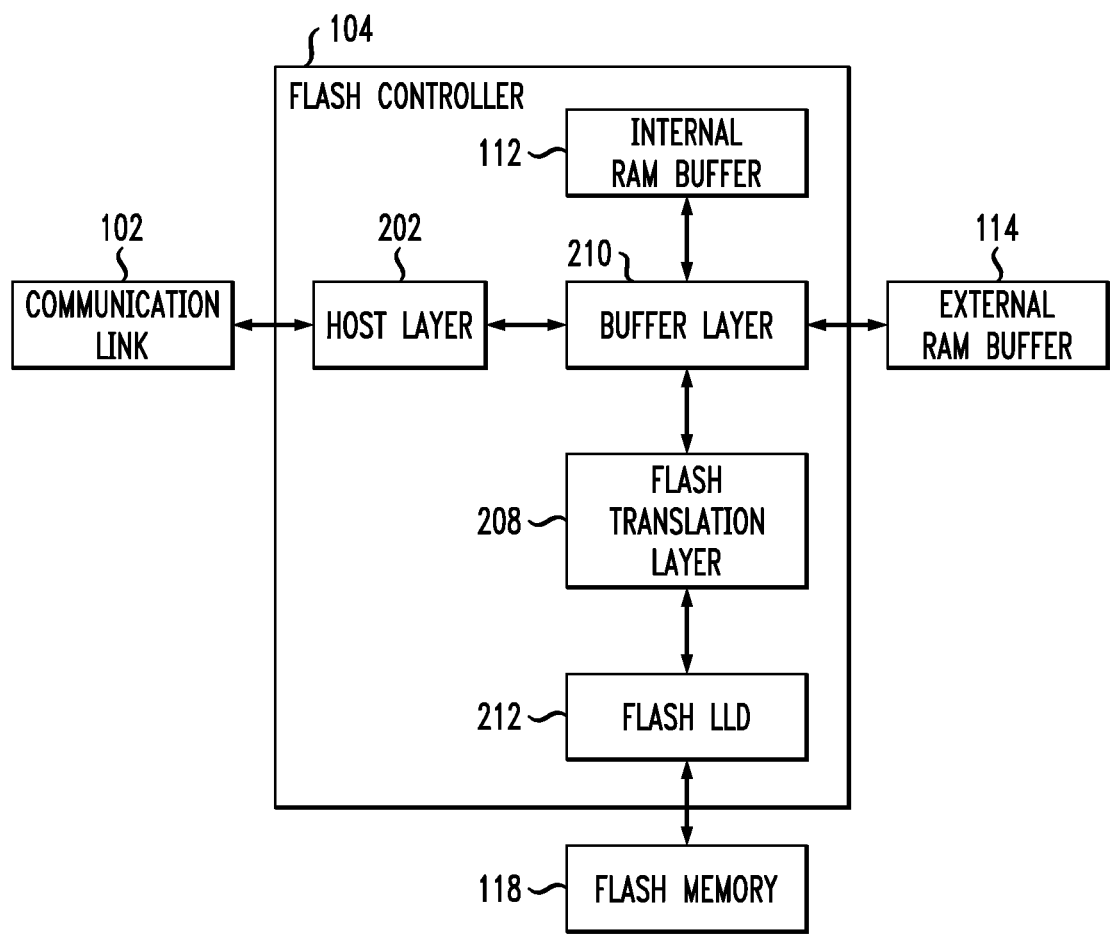
FIG. 2 shows an exemplary functional block diagram of processes employed by the flash memory system of FIG. 1.

FIG. 2 shows an exemplary functional block diagram of process modules implemented as software, hardware, or some combination thereof, within processor 116 of flash controller 104. As shown in FIG. 2, host layer 202 implements protocols to control flow of data between communication link 102 and flash controller 104. For example, host layer 202 might process data access commands from communication link 102 and communicate with flash translation layer (FTL) 208. FTL 208 translates logical-to-physical addresses (and vice-versa) of data stored in flash media 118, for example, by making flash memory storage system 100 appear similar to a conventional HDD. FTL 208 temporarily stores data in a target buffer via buffer layer 210. In general, data transfers between flash media 118 and communication link 102 are buffered in the target buffer comprising at least one of external RAM buffer 114 and internal RAM buffer 112. FTL 208 interfaces with flash media 118 by flash low-level driver 212.

Flash low-level driver 212 implements hardware-specific basic read and write operations of flash memory 118, thus, separating the low-level hardware-specific signal and timing requirements of the flash memory circuitry from the functionality of FTL 208. FTL 208 also enables garbage collection, error recovery, and wear leveling routines for flash media 118. Host layer 202, buffer layer 210 and flash translation layer 208 might include Application Programming Interfaces (APIs), which are protocols or formats used by software to communicate between sub-applications within the software.

For example, flash controller 104 (FIG. 1) receives requests for flash media access from external devices, such as read or write operations, from communication link 102. Received requests are processed by host layer 202. Host layer 202 i) controls all host interface specific commands (e.g. SATA commands), ii) coordinates host-side data transfers and command execution, and iii) processes any other host commands (e.g. status updates). Host layer 202 is in communication with buffer layer 210. FTL 208 also interfaces with buffer layer 210. Since data transfers between communication link 102 and flash media 118 are temporarily stored in buffer memory, buffer layer 210 generally directs the data traffic between host layer 202 and FTL 208. For example, if an external host (not shown) provides, via communication link 102, data to be written to flash media 118, buffer layer 210 might coordinate temporary storage of the data in buffer 114 until FTL 208 coordinates writing the data to flash media 118. Similarly, if the external host requests to read data from flash media 118, buffer layer 210 might temporarily store the data in buffer 114 until host layer 202 coordinates sending the data to the host via communication link 102.

FIG. 3 shows a method 300 of garbage collection operation in accordance with an exemplary embodiment of the present invention. As shown in FIG. 3, FTL 208 might initiate garbage collection operation 300 at step 302. For example, upon exceeding a predetermined threshold ratio of used blocks to available blocks within a given superblock, FTL 208 might initiate garbage collection operation 300. FTL 208 might wait to initiate garbage collection operation 300 during idle time of flash controller 104 when no other operations, such as read or write operations, are currently being processed by flash memory storage system 100.

At step 304, FTL 208 performs an initial scan of a given segment of flash media 118, such as, for example, a selected group of one or more superblocks. FIG. 4 shows detail of an exemplary initial scan sub-routine of garbage collection method 300 of FIG. 3. As shown in FIG. 4, initial scan 304 is initiated at step 402. At step 404, FTL 208 analyzes blocks in each of the selected superblocks to determine the number of valid pages in each block of the superblock. Based on the analysis of step 404, FTL 208, at step 406, constructs an index, for example a bitmap or another type of index, and a count of valid pages in each block. At step 408, initial scan 304 is complete.

Returning to FIG. 3, at step 306, FTL 208 scans the indices and counts of valid pages (or "valid page count") in each block generated during initial scan 304. If any blocks contain less than a threshold number of valid pages, a quick clean operation is initiated at step 308. If no blocks contain less than the threshold number of valid pages, a deep clean operation is initiated at step 310. In some embodiments of the present invention, the threshold number of valid pages might be zero. A threshold value of zero valid pages might be selected since blocks containing zero valid pages are entirely invalid, and can be easily cleaned, as shown in FIG. 5.

FIG. 5 shows detail of an exemplary quick clean sub-routine 308. As shown, a quick clean operation is initiated at step 502. At step 504, FTL 208 deallocates the invalid blocks from the superblock. At step 506, FTL 208 places the invalid blocks into a queue to be erased. The blocks in the queue will be erased by FTL 208 during idle time of flash media 118 when other operations are not being processed. FTL 208 also maintains a free block pool. The free block pool is a listing of erased blocks available for use by the superblock. Once the invalid blocks are erased, the blocks are returned to the free block pool. Thus, quick clean operation 308 frees at least one block of space in a superblock with a relatively minimal impact on the overall performance of flash memory storage system 100. Quick clean operation 308 finishes at step 508, and method 300 advances to step 312, where garbage collection completes.

Returning to FIG. 3, if, at step 306, no blocks contain fewer than the threshold number of valid pages, for example, all blocks contain at least one valid page, a deep clean operation is initiated at step 310. Deep clean operation 310 might be performed "in-line" if space must be freed immediately, meaning that deep clean operation 310 could delay read or write operations to flash media 118, or deep clean operation might be performed in system idle time if it is not critical to free the space. For example, if there are fewer than a minimum threshold of available blocks in the superblock, deep clean operation might be performed "in-line" to increase free storage space. Deep clean operation 310 is shown in greater detail in FIG. 6.

Figure 6:
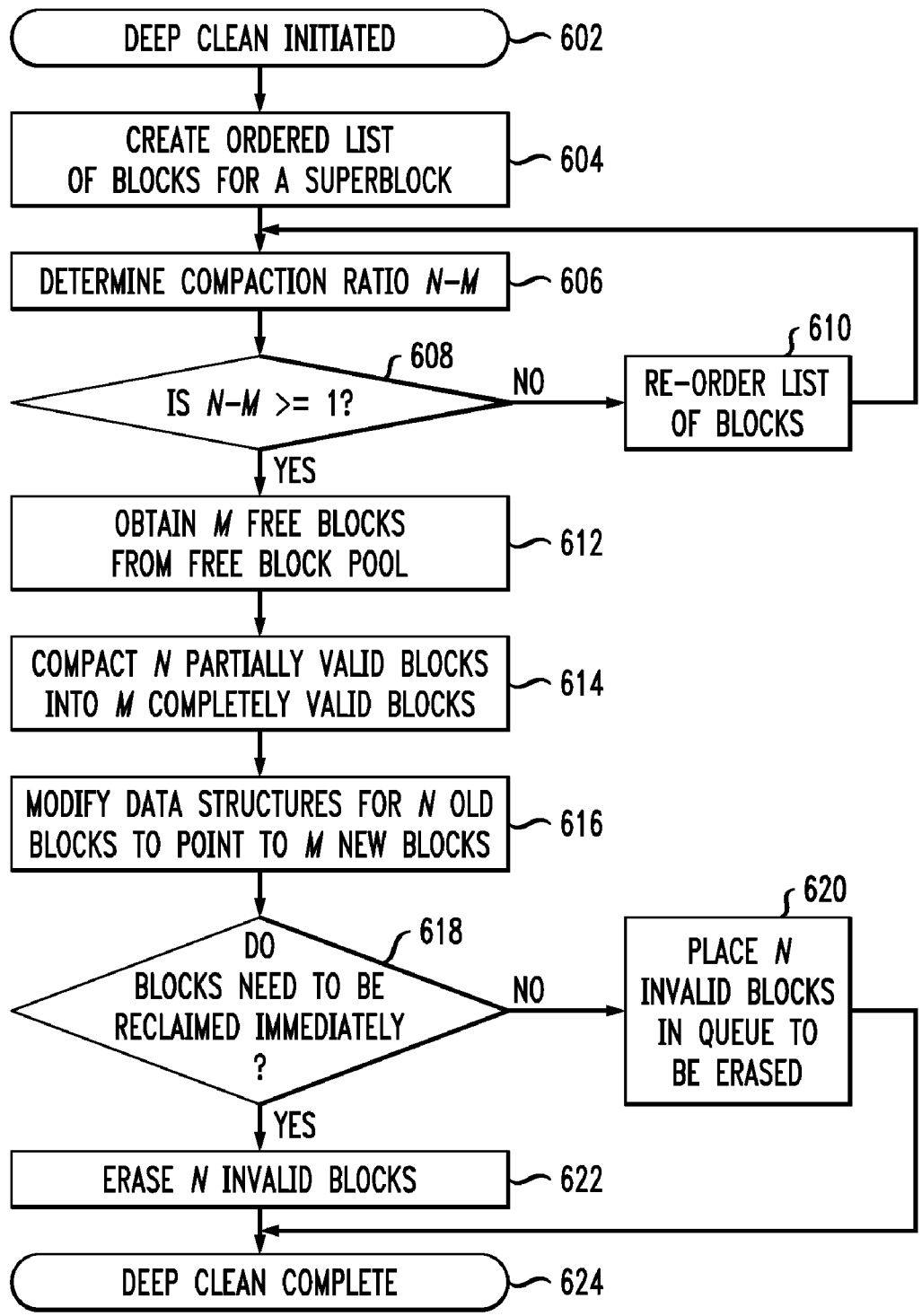
FIG. 6 shows detail of an exemplary deep clean sub-routine of the garbage collection of FIG. 3.

As shown in FIG. 6, deep clean operation 310 is initiated at step 602. At step 604, the data gathered during initial scan 304 is used to create an ordered list of the blocks of a selected superblock. For example, at step 604, FTL 208 might use the valid page count for each block to create an ordered list of blocks, starting with the block containing the fewest valid pages and continuing to the block containing the most valid pages.

At step 606, FTL 208 determines a compaction ratio indicative of a number, N, of partially valid blocks that can be compacted into a number, M, of entirely valid blocks, thus freeing N-M blocks for erasure (where N is greater than or equal to M, and N and M are integers greater than or equal to zero). FTL 208 determines the compaction ratio by processing the ordered list of blocks starting with the block containing the fewest valid pages. Thus, FTL 208 can free the largest number of blocks with the least amount of data movement for valid data. At step 608, if the value of N-M is not greater than a predetermined threshold, processing continues to step 610. At step 610, the list of blocks is reordered, accounting for partially valid blocks that were already accounted for in the compaction ratio determined in step 606. From step 610, the method returns to step 606 and a new compaction ratio is determined at step 606 that is again tested against the predetermined threshold at step 608. If, at step 608, the compaction ratio is greater than the predetermined threshold, at step 612, FTL 208 allocates M free blocks from the free block pool. At step 614, the M free blocks are used to store the valid data compacted from the N partially valid blocks, which now are invalid blocks. At step 616, FTL 208 updates the data structures for the N invalid blocks to refer to the M new blocks. For example, the data structures might include at least one of: a logical-to-physical translation table, one or more summary pages, a page global directory, one or more page middle directories and one or more page tables.

At step 618, deep clean operation 310 might be performed "in-line" if space must generally be freed immediately, as described above. Thus, at step 618, in embodiments of the present invention, if there are fewer than a minimum threshold of available blocks in the superblock, deep clean operation 310 might be performed "in-line" to increase free storage space, meaning that deep clean operation 310 might delay read or write operations to flash media 118 in order to erase one or more of the N invalid blocks immediately at step 622. Once the invalid blocks are erased, deep clean operation 310 is complete at step 624. If the number of available blocks in the superblock is greater than a minimum threshold, at step 620 FTL 208 places the N invalid blocks in the queue to be erased, which can be performed during idle time of flash memory storage system 100. Once the N invalid blocks are placed in the queue to be erased, deep clean operation 310 finishes at step 624 and method 300 advances to step 312 of FIG. 3 where garbage collection completes.

As would be apparent to one skilled in the art, there is a tradeoff between the frequency of performing garbage collection operations and efficient usage of system resources. For example, by waiting longer to perform garbage collection method 300, more blocks of data in each superblock become invalid. More invalid data blocks increases the likelihood that quick clean operation 308 can be performed and minimizes the data that must be moved if deep clean operation 310 is required. However, waiting longer to perform a garbage collection operation reduces the storage space available to the end-user of flash memory storage system 100 since invalid blocks might not be freed quickly and, thus, more blocks are used to store invalid data. As described above, garbage collection might be performed upon exceeding a predetermined threshold ratio of used blocks to available blocks within a given superblock. Some embodiments of the present invention further allow for the predetermined threshold ratio of used blocks to available blocks within a given superblock to be configurable by a user of flash memory storage system 100. For example, in embodiments of the present invention, the threshold ratio of used blocks to available blocks is a user-configurable register value of flash controller 104.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software may also be implemented as processes of circuits. Such circuits may be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A method of recovering storage space on a solid state disk (SSD), comprising:
   a) determining an index and a valid page count for each block of at least one segment of an SSD;
   b) if the valid page count of at least one block in the at least one segment of the SSD is zero, then, performing a quick clean;
   c) otherwise, performing a deep clean.

2. The invention of claim 1, wherein for step b), the step of performing a quick clean further comprises:
   b1) deallocating from the segment of the SSD the at least one block having the valid page count of zero; and
   b2) placing the deallocated at least one block in a queue for erasure.

3. The invention of claim 1, wherein for step c), the step of performing a deep clean further comprises:
   c1) determining a compaction ratio, N-M, for the at least one segment of the SSD, wherein N is an integer number of partially valid blocks and M is an integer number of free blocks corresponding to compiled valid data from each of the N partially valid blocks;
   c2) allocating the M free blocks from a free block pool;
   c3) compacting the valid data from each of the N partially valid blocks into the M free blocks, thereby forming M entirely valid blocks;
   c4) modifying at least one data structure of the at least one segment of the SSD to refer to the M entirely valid blocks; and
   c5) placing the N partially valid blocks in the queue for erasure.

4. The invention of claim 1, wherein the method of recovering storage space comprises executing the method during idle time of the SSD.

5. The invention of claim 1, wherein the step of placing the N blocks in the queue for erasure further comprises:
   erasing the N partially valid blocks without waiting for an idle time of the SSD, if a ratio of used blocks to available blocks within a given segment of the SSD has not reached a minimum threshold.

6. The invention of claim 1, wherein the step of placing the N blocks in the queue for erasure further comprises:
   erasing the N partially valid blocks during an idle time of the SSD, if a ratio of used blocks to available blocks within a given segment of the SSD reaches a minimum threshold.

7. The invention of claim 1, wherein, for step a), the at least one segment of an SSD is a superblock.

8. The invention of claim 7, wherein the method comprises executing the method upon reaching a predetermined threshold ratio of used blocks to available blocks within a given superblock.

9. The invention of claim 8, wherein the method comprises configuring, by a user, a value for the threshold ratio of used blocks to available blocks.

10. The invention of claim 1, wherein, for step c), the at least one data structure of the at least one segment of the SSD comprises at least one of:
    a logical-to-physical translation table, one or more summary pages, a page global directory, one or more page middle directories and one or more page tables.

11. A machine-readable storage medium, having encoded thereon program code, wherein, when the program code is executed by a machine, the machine implements a method of recovering storage space on a solid state disk (SSD), the method comprising:
    a) determining an index and a valid page count for each block of at least one segment of an SSD;
    b) if the valid page count of at least one block in the at least one segment of the SSD is zero, then, performing a quick clean;
    c) otherwise, performing a deep clean.

12. The invention of claim 11, wherein for step b), the step of performing a quick clean further comprises:
    b1) deallocating from the segment of the SSD the at least one block having the valid page count of zero; and
    b2) placing the deallocated at least one block in a queue for erasure.

13. The invention of claim 11, wherein for step c), the step of performing a deep clean further comprises:
    c1) determining a compaction ratio, N-M, for the at least one segment of the SSD, wherein N is an integer number of partially valid blocks and M is an integer number of free blocks corresponding to compiled valid data from each of the N partially valid blocks;
    c2) allocating the M free blocks from a free block pool;
    c3) compacting the valid data from each of the N partially valid blocks into the M free blocks, thereby forming M entirely valid blocks;

c4) modifying at least one data structure of the at least one segment of the SSD to refer to the M entirely valid blocks; and c5) placing the N partially valid blocks in the queue for erasure.

14. The invention of claim 11, wherein the method of recovering storage space comprises executing the method during idle time of the SSD.

15. The invention of claim 11, wherein the step of placing the N blocks in the queue for erasure further comprises:

erasing the N partially valid blocks without waiting for an idle time of the SSD, if a ratio of used blocks to available blocks within a given segment of the SSD has not reached a minimum threshold.

16. The invention of claim 11, wherein the step of placing the N blocks in the queue for erasure further comprises:

erasing the N partially valid blocks during an idle time of the SSD, if a ratio of used blocks to available blocks within a given segment of the SSD reaches a minimum threshold.

17. The invention of claim 11, wherein, for step a), the at least one segment of an SSD is a superblock.

18. An apparatus for recovering storage space on a solid state disk (SSD), the SSD having at least one segment including one or more blocks, wherein the one or more blocks have at least one of valid data and invalid data, the apparatus comprising:

a counter configured to maintain an index and a valid page count for each block of the at least one segment of the SSD, each of the at least one segments of the SSD having at least one corresponding data structure identifying each block having valid data;

a free block pool of erased blocks and a queue of blocks for erasure;

a processor in communication with the counter, the free block pool, the queue of blocks for erasure, and the data structures, the processor adapted to:

a) if the valid page count for at least one block in the at least one segment of the SSD is zero, then: deallocate from the segment of the SSD the at least one block having the zero valid page count and place the deallocated at least one block in the queue for erasure;

b) otherwise: i) determine a compaction ratio, N-M, for the at least one segment of the SSD, wherein N is an integer number of partially valid blocks and M is an integer number of free blocks corresponding to compiled valid data from each of the N partially valid blocks, ii) allocate M free blocks from the free block pool, iii) compact the valid data from each of the N partially valid blocks into the M free blocks, thereby forming M entirely valid blocks, iv) modify the at least one data structure of the at least one segment of the SSD to refer to the M entirely valid blocks; and place the N blocks in a queue for erasure.

19. The invention of claim 18, wherein the SSD comprises flash memory.

20. The invention of claim 18, wherein the apparatus is implemented in a monolithic integrated circuit chip.

* * * * *